United States Patent [19]

Yokoyama et al.

[11] Patent Number: 4,641,366

[45] Date of Patent: Feb. 3, 1987

[54] PORTABLE RADIO COMMUNICATION APPARATUS COMPRISING AN ANTENNA MEMBER FOR A BROAD-BAND SIGNAL

[75] Inventors: Yukio Yokoyama; Katsuji Kimura, both of Tokyo; Naohisa Goto, Kanagawa, all of Japan

[73] Assignees: NEC Corporation; Naohisa Goto, both of Japan

[21] Appl. No.: 783,823

[22] Filed: Oct. 3, 1985

[30] Foreign Application Priority Data

Oct. 4, 1984 [JP] Japan ................................ 59-208627

[51] Int. Cl.[4] ................................................ H04B 1/38

[52] U.S. Cl. ........................................ 455/89; 455/90; 343/702

[58] Field of Search .................. 455/89, 90, 128, 129, 455/347, 351; 343/702

[56] References Cited

U.S. PATENT DOCUMENTS 4,571,595 2/1986 Phillips et al. ...................... 343/702
4,584,709 4/1986 Kneisel et al. ........................ 455/89
4,591,863 5/1986 Patsiokas ............................ 343/702

FOREIGN PATENT DOCUMENTS 59-77724 5/1984 Japan .

*Primary Examiner*—Jin F. Ng
*Attorney, Agent, or Firm*—Ostrolenk, Faber, Gerb & Soffen

[57] ABSTRACT

In a portable radio communication apparatus comprising a handset (20) having a side surface (23) and a recessed surface (24), first and second antennae (51 and 52) of different resonance frequencies are fixed to the recessed surface by first and second conductive plates (55 and 56), respectively. First and second conductive lines (61 and 62) connect a common conductive line (63) to the first and the second antennae, respectively. The common conductive line is connected to an electro-audio and audio-electro converting device (30) to feed a transmitting electric signal to the first and the second antennae and to receive the received electric signal from the first and second antennae. The first and the second antennae have first and second antenna widths ($W_1$ and $W_2$), respectively. The first and the second conductive plates have first and second plate widths, respectively, and first and second axes centrally of the first and the second plate widths, respectively. The first and the second plate widths are not greater than the first and the second antenna widths, respectively. The first and the second axes are spaced wider than a half of a sum of the first and the second antenna widths.

7 Claims, 13 Drawing Figures

PORTABLE RADIO COMMUNICATION APPARATUS COMPRISING AN ANTENNA MEMBER FOR A BROAD-BAND SIGNAL

BACKGROUND OF THE INVENTION

This invention relates to a portable radio communication apparatus which consists of a handset and an antenna member in outline.

It is general that a whip antenna or a sleeve antenna of a predetermined length is used as the antenna member for a portable radio communication apparatus of the type described. The whip antenna or the sleeve antenna is supported by a casing of the radio communication apparatus so as to protrude from the casing, which primarily serves as the handset. Inasmuch as the whip antenna or the sleeve antenna protrudes from the casing, a conventional radio communication apparatus is defective in that the radio communication apparatus is poor in portability and that the antenna is apt to be broken when the apparatus is carried by an owner.

An improved radio communication apparatus is disclosed in Japanese Unexamined Patent Publication Ser. No. Syô 59-77724, namely, 77724 of 1984. As will later be described with reference to several of nine figures of the accompanying drawing, the radio communication apparatus comprises a casing for a handset. The casing has a side surface, a recessed surface, and a connecting surface between the side and the recessed surfaces. An antenna member of a predetermined antenna width is fixed to the recessed surface by a conductive plate member of a predetermined plate length so that the antenna member does not protrude outwardly of the side surface. With this structure, the radio communication apparatus has a good portability because the antenna member does not project outwardly of the side surface. However, an antenna portion comprising the antenna and the conductive plate members becomes bulky in order to practically carry out communication of a signal of a broad frequency band. This is because the antenna width and the plate length should be increased for the broad-band communication as will later be described. If the antenna portion becomes large in size, portability becomes poor. Thus, the improved radio communication apparatus is not suitable to the broad-band communication.

SUMMARY OF THE INVENTION

It is therefore an object of this invention to provide a portable radio communication apparatus which is suitable to broad-band communication.

It is another object of this invention to provide a portable radio communication apparatus of the type described which is small in size.

Other object of this invention will become clear as the description proceeds.

A portable radio communication apparatus to which this invention is applicable comprises a handset having a side surface, a recessed surface, and a connecting surface between the side and the recessed surfaces, an antenna member, a conductive plate member fixing the antenna member to the recessed surface so that the antenna member does not protrude outwardly of the side surface, electro-audio and audio-electro converting means housed in and coupled to the handset for converting a received electric signal to a received audio signal and a transmitting audio signal to a transmitting electric signal, and a conductive line member for feeding the transmitting electric signal to the antenna member and for receiving the received electric signal from the antenna member. According to this invention, the antenna member comprises a first and a second antenna having different resonance frequencies and first and second predetermined points, respectively. The plate member comprises a first and a second conductive plate fixing the first and the second antennae to the recessed surface, respectively. The conductive line member comprises a first, a second, and a common conductive line. The first and the second conductive lines connect the common conductive line to the first and the second predetermined points, respectively. The common conductive line is connected to the electro-audio and audio-electro converting means to feed the transmitting electric signal to the first and the second antennae and to receive the received electric signal from the first and the second antennae.

DESCRIPTION OF THE PREFERRED EMBODIMENT

Figure 1:
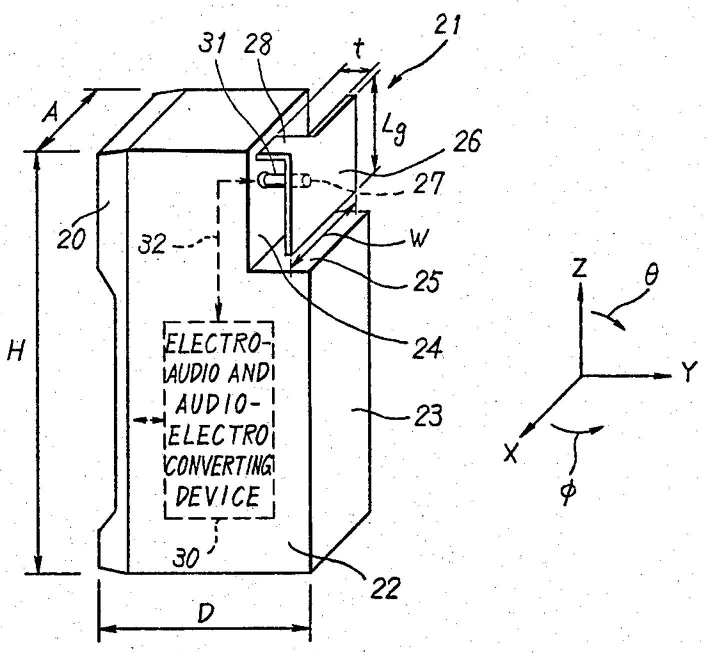
FIG. 1 PRIOR ART
FIG. 1 is a perspective view of a conventional portable radio communication apparatus.

Referring to FIG. 1, a conventional portable radio communication apparatus will be described for a better understanding of this invention. The portable radio communication apparatus is substantially equivalent to the improved portable radio communication apparatus described in the preamble of the instant specification. The radio communication apparatus comprises a handset 20 and an antenna portion 21. The handset 20 has a handset casing 22 which is made of a conductive material and which has a box shape defining a hollow space therein. The handset casing 22 has a front surface which provides the handset 20, a side surface 23 opposed to the front surface, a recessed surface 24, and a connecting surface 25 between the side and the recessed surfaces 23 and 24. Although not depicted, the handset 20 comprises a transmitter and a receiver in the space.

The antenna portion 21 comprises an antenna member 26 having a predetermined position which serves as a feeding point 27. The antenna member 26 has an antenna length $L_g$, an antenna width W, and a free end spaced from the recessed and the connecting surfaces 24 and 25.

A conductive plate member 28 of the antenna portion 21 fixes the antenna member 26 to the recessed surface 24 so that the antenna member 26 does not protrude outwardly of the side surface 23. The conductive plate member 28 has a plate length t and a plate width which is narrower than the antenna width W. The plate length t is substantially same as a distance between the antenna member 26 and the recessed surface 24.

An electro-audio and audio-electro converting device 30 is housed in the handset casing 22 and coupled to the handset 20. More particularly, the converting device 30 is connected to the receiver so as to convert a received electric signal to a received audio signal and to the transmitter so as to convert a transmitting audio signal to a transmitting electric signal.

A feeding pin 31 of a conductive material is connected to the feeding point 27. A conductive line 32 connects the feeding pin 31 and the converting device 30. The feeding pin 31 and the conductive line 32 are operable as a conductive line member which is for feeding the transmitting electric signal to the antenna member 26 and for receiving the received electric signal from the antenna member 26. The transmitting and the received electric signals, as herein called, are transmitted to and received from a counterpart radio communication apparatus and are radio signals which may have a common wavelength λ.

The wavelength λ is typically of 900 MHz and is variable in a wide frequency band. The transmitting and the received electric signals may have different wavelengths in the frequency band. By way of example, the portable radio communication apparatus has an apparatus width A approximately equal to 0.12λ, an apparatus height H approximately equal to 0.55λ, and an apparatus depth D approximately equal to 0.24λ. With this structure, the portable radio communication apparatus has a good portability because the antenna member 26 does not protrude outwardly of the side surface 23.

Figure 2A:
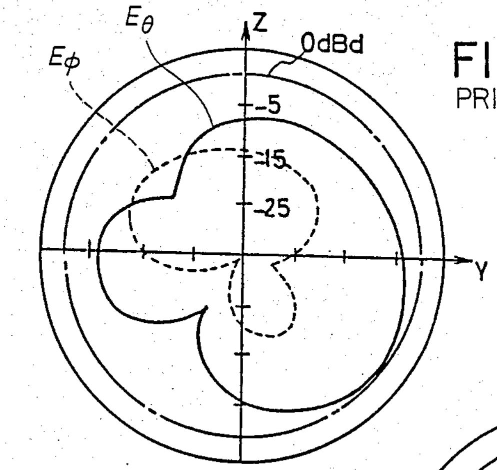
FIG. 2(a) PRIOR ART
FIGS. 2(*a*), (*b*), and (*c*) show graphical representations for use in describing directivities of an antenna portion of the conventional portable radio communication apparatus.
Figure 2B:
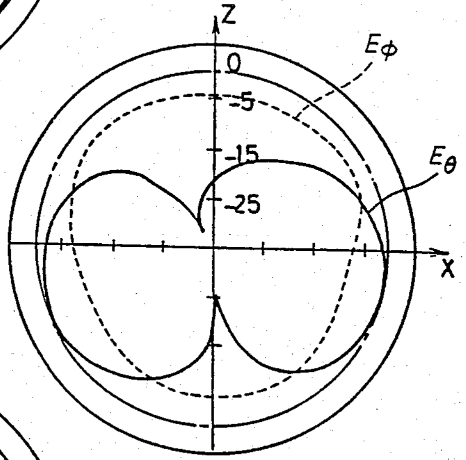
FIG. 2(b) PRIOR ART
Figure 2C:
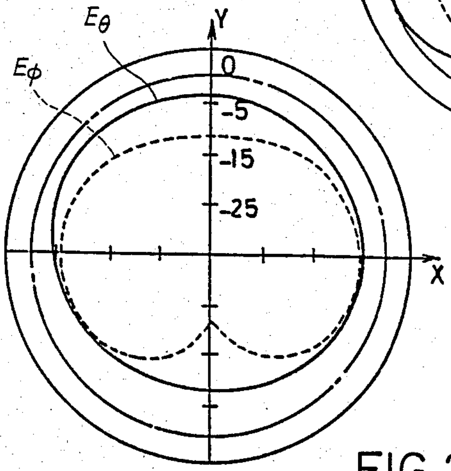
FIG. 2(c) PRIOR ART

Referring to FIG. 2, a directivity of the antenna portion 21 of the radio communication apparatus will now be described. In the manner depicted in FIG. 1, X-Y-Z orthogonal coordinate axes are parallel to the apparatus width A, depth D, and height H, respectively. FIG. 2(*a*) shows the directivity in a plane comprising the Y and Z axes. FIG. 2(*b*) shows the directivity in another plane comprising the X and Z axes. FIG. 2(*c*) shows the directivity in still another plane comprising the X and Y axes. Throughout FIGS. 2(*a*) to (*c*), $E_{74}$ represents an antenna gain as regards a vertically polarized wave component while $E_\phi$ represents another antenna gain as regards a horizontally polarized wave component. It is apparent from FIGS. 2(*a*) to (*c*) that the radio communication apparatus is capable of broadly radiating the vertically and the horizontally polarized wave components. It is therefore possible to carry out excellent communication without regard to the direction of the antenna member 26 and consequently to angles in which the handset casing 23 is held.

Figure 3:
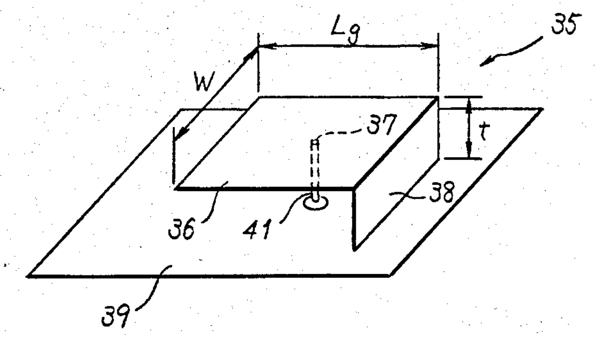
FIG. 3 PRIOR ART
FIG. 3 is a schematic perspective view of a conventional antenna member.

Referring to FIG. 3, another conventional antenna portion 35 will be described. The antenna portion 35 is known as a micro strip antenna having an end which is grounded. The antenna portion 35 comprises an antenna member 36 of a rectangular shape having an antenna width W and an antenna length $L_g$. The antenna member 36 has a predetermined position which serves as a feeding point 37. A conductive plate member 38 has a plate length t and a plate width W which is substantially equal to that of the antenna member 36. The plate length t is substantially equal to a distance between the antenna member 36 and the grounding conductive plate 39 which may be a portion of the handset casing 22 (FIG. 1) and grounds the conductive plate member 38. The grounding conductive plate 39 has a hole. A feeding pin 41 of a conductive material is put through the hole and is connected to the feeding point 37. The feeding pin 41 is insulated from the grounding conductive plate 39 around the hole periphery by an insulator. The antenna portion 21 illustrated in FIG. 3 becomes equivalent to that illustrated in FIG. 1 by narrowing the plate width W and by shortening the plate length t of the conductive plate member 38. In other words, the conductive plate member 38 of the antenna portion 21 shown in FIG. 3 has a decreased inductance in comparison with that illustrated in FIG. 1. Therefore, the conductive plate member 38 is electrically equivalent to that illustrated in FIG. 1.

Figure 4:
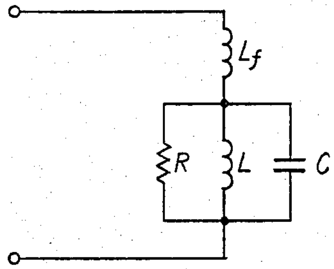
FIG. 4 shows an equivalent circuit of the antenna portion illustrated in FIG. 3.

Referring to FIG. 4, an equivalent circuit of the antenna portion 35 illustrated in FIG. 3 will now be described. The equivalent circuit is obtained when the antenna portion 35 is seen from the hole of the conductive plate 39. As is known in the art, the equivalent circuit has a series connection of an inductance $L_f$ and a resonance circuit which is composed of an inductance L, a capacitance C, and a resistance R. The inductance L, the capacitance C, and the resistance R are connected parallel to one another and are therefore operable as a parallel resonance circuit. The inductance $L_f$ is an inductance component of the feeding pin 41. The resistance R varies with a location of the feeding point 37 and increases as the feeding point 37 becomes remote from the conductive plate member 38. The antenna portion 35 has a resonance frequency $f_0$ which is represnted by:

$$f_0 = \tfrac{1}{2}\pi\sqrt{LC} \qquad (1)$$

Inasmuch as the antenna length $L_g$ is substantially equal to λ/4, the resonance frequency $f_0$ is approximately decided by the antenna length $L_g$ of the antenna member 36.

Figure 5:
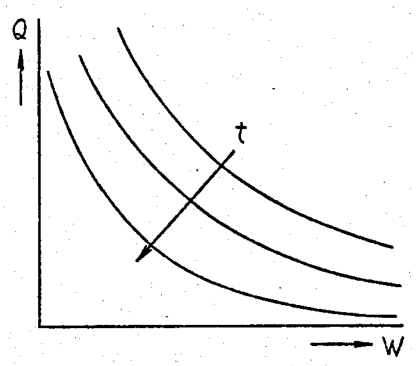
FIG. 5 shows a graphical representation for use in describing a selectivity of the antenna portion illustrated in FIG. 3.

Referring to FIG. 5, a selectivity of the antenna portion 35 illustrated in FIG. 3 will now be described and is specified by a quality factor Q. The quality factor Q is decided by the antenna width W of the antenna member 36 and the plate length or the distance t between the antenna member 36 and the grounding conductive plate 39. Specifically, the quality factor Q is approximately inversely proportional to a product of the antenna width W and the distance t.

Referring back to FIG. 1, the antenna portion 21 has an antenna characteristic similar to that of the antenna portion 35 illustrated in FIG. 3. As long as the radio communication apparatus is used for narrowband communication, the antenna width W and the plate length or the distance t may not be great as is apparent from FIG. 5. Therefore, the antenna portion 21 may be small. As a result, it is possible to realize a radio communication apparatus which has a good portability and a small size.

However, the antenna portion 21 becomes large when the radio communication apparatus is used for broadband communication. Especially, a plurality of channels are used in such a communication system. This is because the antenna width W and the distance t must be increased for the broad-band communication in the manner which will be understood from FIG. 5. The antenna portion 21 has a frequency bandwidth determined by the resonance frequency thereof. Let the frequency bandwidth be, for example, about eight percent of the resonance frequency of the antenna portion 21 on condition that a VSWR (Voltage Standing-Wave Ratio) does not exceed 2. Under the circumstances, the antenna portion 21 occupies about six percent of an entire volume of the radio communication apparatus. When a cover is used in covering the antenna portion 21, the antenna portion 21 and the cover occupy about ten percent of the entire volume.

In the hollow space, the handset casing 22 (FIG. 1) contains internal elements, such as the electro-audio and audio-electro converting device 30, the transmitter, the receiver, and an electric power source for operating the converting device 30, the transmitter, and the receiver. When the antenna portion 21 becomes bulky with the portability of the handset 20 kept as it is, the space within the handset casing 22 inevitably decreases. Such a decreased space makes it difficult to house the internal elements in the space. It is therefore difficult to realize the radio communication apparatus as a portable type. Thus, the radio communication apparatus is unsuitable to the broad-band communication.

Figure 6:
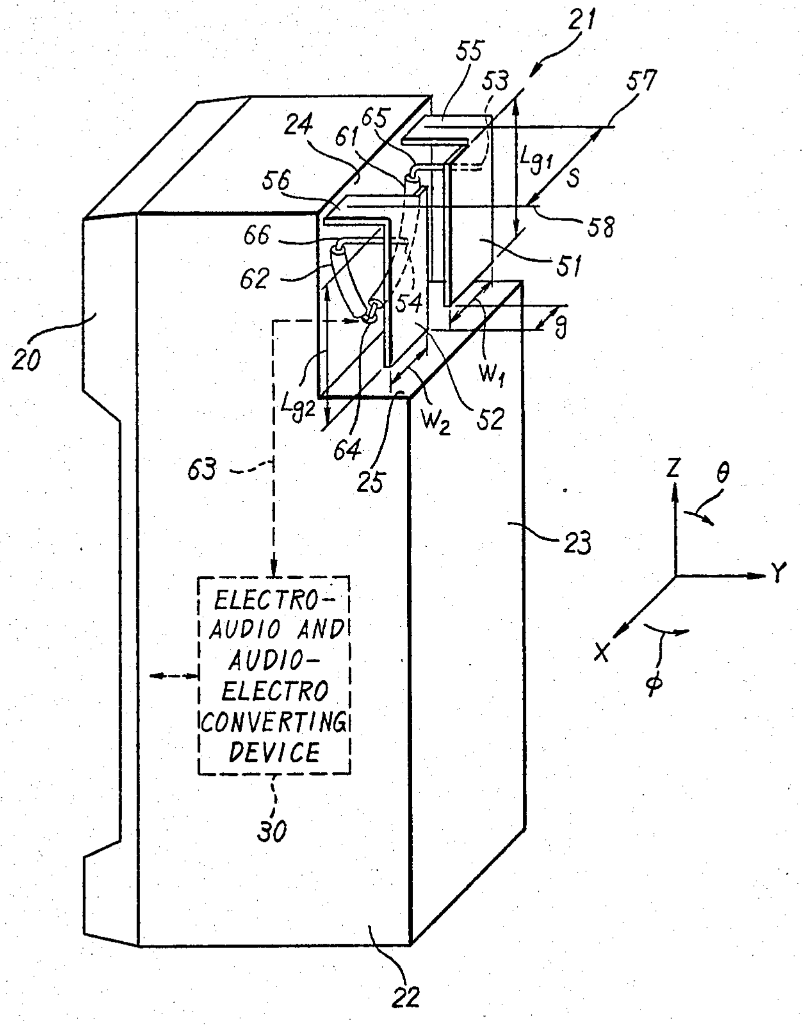
FIG. 6 is a perspective view of a portable radio communication apparatus according to an embodiment of this invention.

Referring to FIG. 6, a portable radio communication apparatus according to an embodiment of this invention comprises similar parts designated by like reference numerals. The antenna portion 21 comprises first and second antennae 51 and 52 which are operable as the antenna member 26 illustrated in FIG. 1 and which may be called radiating plates. The first and the second antennae 51 and 52 have first and second antenna lengths $L_{g1}$ and $L_{g2}$, respectively. The first and the second antenna lengths $L_{g1}$ and $L_{g2}$ are different from each other so that the first and the second antennae 51 and 52 have different resonance frequencies $f_1$ and $f_2$, respectively. The first and the second antennae 51 and 52 have first and second antenna widths $W_1$ and $W_2$, respectively. The first and the second antennae 51 and 52 have first and second predetermined points serving as first and second feeding points 53 and 54, respectively.

The antenna portion 21 further comprises first and second conductive plates 55 and 56 which are operable in a manner similar to the conductive plate member 28 illustrated in FIG. 1. The first and the second conductive plates 55 and 56 fix the first and the second antennae 51 and 52 to the recessed surface 24, respectively. The first and the second conductive plates 55 and 56 have first and second plate widths, respectively. For convenience of description, first and second axes 57 and 58 are defined centrally of the first and the second plate widths of the first and the second conductive plates 55 and 56, respectively. The first and the second plate widths are not greater than the first and the second antenna widths $W_1$ and $W_2$, respectively. The first and the second conductive plates 55 and 56 have first and second plate lengths, respectively.

In the antenna portion 21, the first and the second antennae 51 and 52 are substantially coplanar and are parallel to the recessed surface 24. That is, the first and the second plate lengths are substantially equal to each other. The first and the second plate lengths are given by first and second distances between the recessed surface 24 and the first and the second antennae 51 and 52, respectively. The first and the second antennae 51 and 52 have first and second ends remote from the connecting surface 25, respectively. Each of the first and the second ends is directed upwards of FIG. 6. The first and the second conductive plates 55 and 56 fix the first and the second antennae 51 and 52 to the recessed surface 24 at the first and the second ends, respectively. Each of the first and the second antennae 51 and 52 has a free end which is adjacent to the connecting surfaces 24 and 25 and which is spaced from the recessed and the connecting surfaces 24 and 25. The free end is directed downwards of FIG. 6.

The radio communication apparatus further comprises first, second, and common conductive lines 61, 62, 63 which are operable in a manner similar to the conductive line member described in the conventional radio communication apparatus. The first and the second conductive lines 61 and 62 connect the common conductive line 63 to the first and the second predetermined points 53 and 54, respectively. Specifically, the first, the second, and the common conductive lines 61, 62, and 63 are connected to one another at a line connecting point 64. The first and the second conductive lines 61 and 62 have first and second line lengths $l_1$ and $l_2$, respectively. The common conductive line 63 is connected to the electro-audio and audio-electro converting device 30 to feed the transmitting electric signal to the first and the second antennae 51 and 52 and to receive the received electric signal from the first and the second antennae 51 and 52.

The first and the second conductive lines 61 and 62 have first and second feeding pins 65 and 66 connected to the first and the second feeding points 53 and 54, respectively. First and second coaxial cables are used for the first and the second conductive lines 61 and 62, respectively. Each of the first and the second coaxial cables has an inner conductor and an outer conductor. The outer conductor is mechanically and electrically connected to the handset casing 22. Inasmuch as the handset casing 22 is made of a conductive material, the handset casing 22 shields the internal elements from an electromagnetic field.

Figure 7:
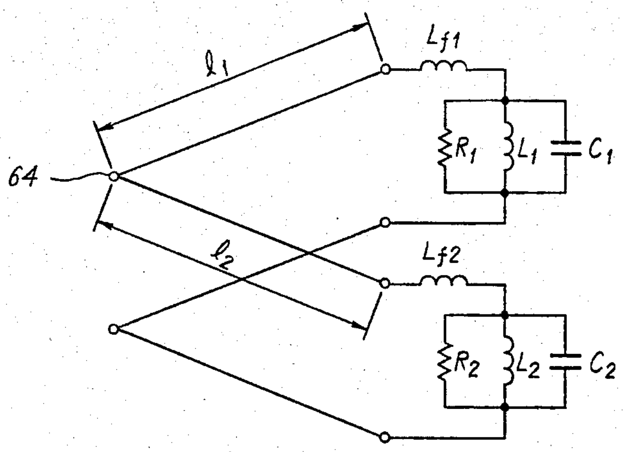
FIG. 7 shows an equivalent circuit of an antenna portion of the portable radio communication apparatus depicted in FIG. 6.

Referring to FIG. 7, an equivalent circuit of the antenna portion 21 will now be described. It can be understood that the antenna portion 21 has a pair of antenna portions 35 as illustrated in FIG. 3. Inasmuch as the antenna portion 35 has an equivalent circuit shown in FIG. 4, it is apparent that the antenna portion 21 has the equivalent circuit shown in FIG. 7.

Like in FIG. 4, first and second pin inductances $L_{f1}$ and $L_{f2}$ are representative of inductance components of the first and the second feeding pins 65 and 66, respectively. A first partial antenna portion is equivalently represented by inductance $L_{f1}$ and a parallel resonance circuit which is composed of resistance $R_1$, inductance $L_1$, and capacitance $C_1$. Similarly, a second partial antenna portion is represented by inductance $L_{f2}$ and a parallel circuit of resistance $R_2$, inductance $L_2$, and capacitance $C_2$. First and second resistances $R_1$ and $R_2$ vary with locations of the first and the second feeding points 53 and 54, respectively. The first and the second resistances $R_1$ and $R_2$ increase as the first and the second feeding points 53 and 54 become remote from the first and the second conductive plates 55 and 56, respectively.

It will be assumed that the antenna portion 21 has an impedance characteristic $Z_0$ when the antenna portion 21 is seen from the line connecting point 64. Inasmuch as the antenna portion 21 is represented by a pair of LCR parallel resonant circuits as shown in FIG. 7, the impedance characteristic $Z_0$ can approximately be converted to another impedance characteristic of an LCR series resonant circuit by selecting predetermined values for the first and the second line lengths $l_1$ and $l_2$, respectively.

It will furthermore be assumed that $\lambda_0$ represents a wavelength of the transmitting or the received electric signal which is propagated through the first or the second conductive line 61 or 62. Taking the pin impedances $L_{f1}$ and $L_{f2}$ into consideration, each of the first and the second line lengths $l_1$ and $l_2$ is approximately equal to $(\lambda_0/8+n\lambda_0/2)$, where n represents an integer which is equal to or greater than zero.

The antenna portion 21 is thus specified by the first and second partial antenna portions as mentioned above. The first partial antenna portion comprises the first antenna 51, the first conductive plate 55, and the first conductive line 61. The second partial antenna portion comprises the second antenna 52, the second conductive plate 56, and the second conductive line 62. It is assumed that the first partial antenna portion has a first partial impedance at the second resonance frequency $f_2$, when seen from the line connecting point 64 and that the second partial antenna portion has a second partial impedance at the first resonance frequency $f_1$, when seen from the line connecting point 64. Inasmuch as the first resonance frequency $f_1$ is separated from the second resonance frequency $f_2$, each of the first and the second partial impedances has a large imaginary part and a high impedance value in the LCR series resonance circuit. As a result, the radio communication apparatus has an impedance characteristic of a double resonance type wherein an impedance related to the first antenna 51 appears in the vicinity of the first resonance frequency $f_1$ while another impedance related to the second antenna 52 appears in the vicinity of the second resonance frequency $f_2$. That is to say, it may be understood that the first antenna 51 mainly operates in the vicinity of the first resonance frequency $f_1$ while the second antenna 52 mainly operates in the vicinity of the second resonance frequency $f_2$.

Figure 8:
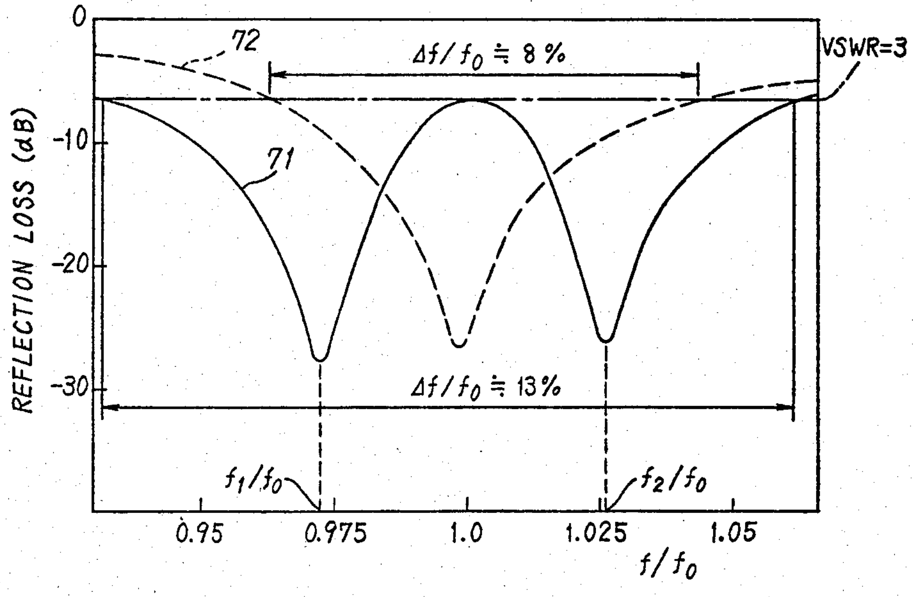
FIG. 8 shows a graphical representation for use in describing a reflection loss of the antenna portion of the portable radio communicating apparatus illustrated in FIG. 6.

Referring to FIG. 8, reflection loss characteristics of the antenna portions 21 illustrated in FIGS. 1 and 6 will now be described. The antenna portion 21 illustrated in FIG. 6 has a reflection loss characteristic 71 while the antenna portion 21 illustrated in FIG. 1 has another reflection loss characteristic 72. In FIG. 8, the abscissa represents a normalized frequency $f/f_0$ of the transmitting and the received electric signal of the antenna portion 21 illustrated in FIGS. 1 and 6. The ordinate represents reflection loss. When the resonance frequency $f_0$ is 900 MHz, the antenna portion 21 illustrated in FIG. 6 has the first resonance frequency $f_1$ approximately equal to 876 MHz and the second resonance frequency $f_2$ approximately equal to 923 MHz.

It is apparent from FIG. 8 that the antenna portion 21 illustrated in FIG. 6 has a double resonance characteristic described above. In the antenna portion 21 illustrated in FIG. 6, the VSWR of a medium point between the first and the second (normalized) resonance frequencies $f_1/f_0$ and $f_2/f_0$ becomes worse as a frequency difference between the second and the first resonance frequencies $f_2$ and $f_1$ becomes large. The VSWR of each of the first and the second (normalized) resonance frequencies $f_1/f_0$ and $f_2/f_0$ can be controlled by varying each of the first and the second resistances $R_1$ and $R_2$ illustrated in FIG. 7. The first and the second resistances $R_1$ and $R_2$ can be adjusted by the locations of the first and the second feeding points 53 and 54, respectively.

Under the circumstances, the frequency difference and the locations of the feeding points 53 and 54 are selected so that the VSWR of the medium point does not exceed an allowable VSWR in the radio communication apparatus illustrated in FIG. 6. As a result, the antenna portion 21 of the radio communication apparatus illustrated in FIG. 6 is suitable to the broad-band communication.

Referring back to FIG. 6, description will now be made about a gap g between the first and the second antennae 51 and 52, in order to consider that mutual coupling between the first and the second antennae 51 and 52 which has been ignored so far. Inasmuch as the mutual coupling actually exists between the first and the second antennae 51 and 52, restriction is imposed on a width of the gap g when the first and the second antennae 51 and 52 are attached to the handset casing 22. For example, an excessively narrow gap g makes it difficult to independently select the first and the second resonance frequencies $f_1$ and $f_2$ because the mutual coupling becomes large. Under the circumstances, the gap g is decided in consideration of the mutual coupling. In addition, the first and the second plate widths are not greater than the first and the second antenna widths $W_1$ and $W_2$, respectively. The first and the second axes 57 and 58 are spaced from each other by a spacing s. The mutual coupling decreases as the spacing s becomes long. Experimentally, as the spacing s becomes long, a gap g becomes short. However, the gap g is substantially constant in a case where the spacing s is wider than a half of a sum of the first and the second antenna widths $W_1$ and $W_2$. The spacing s is selected so that it is wider than a half of $(W_1+W_2)$. Thus, the first and the second axes 57 and 58 are spaced wider than the half in the radio communication apparatus.

The first and the second conductive plates 55 and 56 have first and second plate sides outwardly parallel to the first and the second axes 57 and 58, respectively. The first and the second antennae 51 and 52 have first and second antenna sides outwardly of the first and the second axes 57 and 58, respectively. The first and the second conductive plates 55 and 56 fix the first and the second antennae 51 and 52 to the recessed surface 24 with the first and the second plate sides rendered coplanar with the first and the second antenna sides, respectively. In other words, the first and the second conductive plates 55 and 56 are integrally joined to the most widthwise outward parts of the upper ends of the first and the second antennae 51 and 52, respectively. This makes it possible to narrow the gap g. In the radio communication apparatus, the gap g is equal to about $\lambda/100$. Thus, the first and the second antennae 51 and 52 can be located adjacent to each other.

Referring to FIG. 8 again, the reflection loss characteristics 71 and 72 are obtained as regards a case where the resonance frequency $f_0$ is approximately equal to a half of a sum of the first and the second frequencies $f_1$ and $f_2$.

The conventional radio communication apparatus illustrated in FIG. 1 has a first antenna volume which is defined by the antenna member 26 and the distance t. The radio communication apparatus illustrated in FIG.

6 has a second antenna volume equal to a sum of first and second partial antenna volumes and a gap volume. The first partial antenna volume is defined by an area of the first antenna 51 and the first distance. The second partial antenna volume is defined by an area of the second antenna 52 and the second distance. The gap volume is defined by the gap g, a longer one of $L_{g1}$ and $L_{g2}$, and a longer one of the first and the second distances. For comparison of the apparatus illustrated in FIGS. 1 and 6, it is assumed in FIG. 8 that the second antenna volume is approximately equal to the first antenna volume. From the reflection loss characteristics 71 and 72, it is possible to estimate a bandwidth $\Delta f$ of each of the radio communication apparatus illustrated in FIGS. 1 and 6 under the condition of $VSWR \leqq 3$. More particularly, a ratio $\Delta f/f_0$ of the bandwidth $\Delta f$ to the frequency $f_0$ is approximately equal to 8 percent in the radio communication apparatus illustrated in FIG. 1. On the other hand, the radio communication apparatus illustrated in FIG. 6 has the ratio $\Delta f/f_0$ which is approximately equal to 13 percent. Thus, the bandwidth $\Delta f$ of the radio communication apparatus illustrated in FIG. 6 is about 1.5 times that of the radio communication apparatus illustrated in FIG. 1.

Figure 9A:
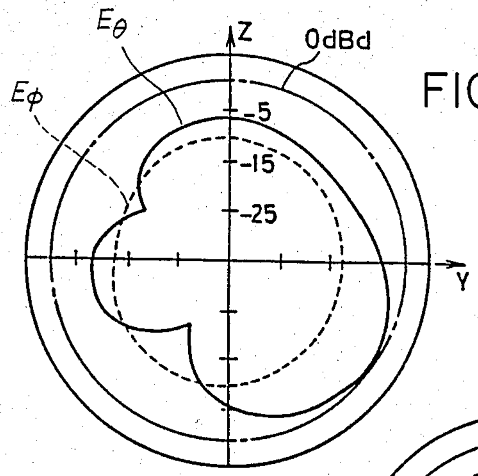
FIGS. 9(*a*), (*b*), and (*c*) show graphical representations for use in describing directivities of the antenna portion of the portable radio communication apparatus shown in FIG. 6.
Figure 9B:
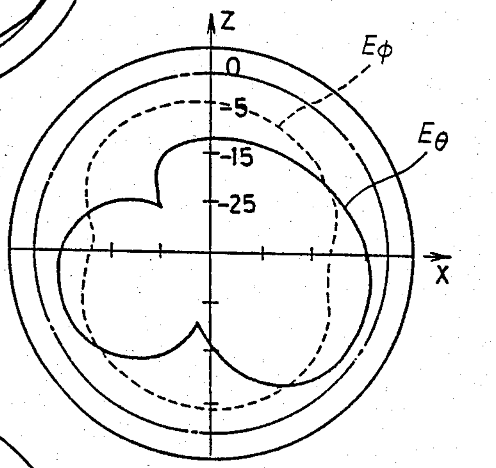
Figure 9C:
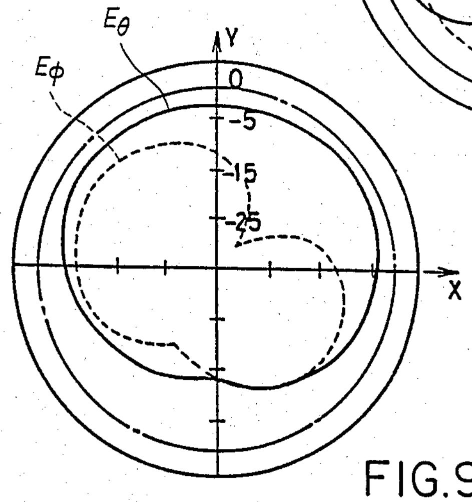

Referring to FIGS. 9(*a*) to (*c*), a directivity of the antenna portion 21 of the radio communication apparatus illustrated in FIG. 6 will now be described. In the manner depicted in FIG. 6, X-Y-Z orthogonal coordinate axes parallel to the apparatus width, depth, and height, respectively. FIG. 9(*a*) shows the directivity in a plane including the Y and Z axes. FIG. 9(*b*) shows the directivity in another plane including the X and Z axes. FIG. 9(*c*) shows the directivity in still another plane including the X and Y axes. Throughout FIGS. 9(*a*) to (*c*), $F_\theta$ represents an antenna gain as regards a vertically polarized wave component while $E_\phi$ represents another antenna gain as regards a horizontally polarized wave component.

Although either the first antenna 51 or the second antenna 52 mainly operates for the frequency of the transmitting or the received signal as described above, the directivity does not vary due to the frequency. Inasmuch as the directivity is approximately equal to the directivity illustrated in FIGS. 2(*a*) to (*c*), no substantial influence is exerted on the directivity by dividing the antenna portion 21 into two partial antenna portions, as mentioned above.

It is now appreciated that this invention provides a portable radio communication apparatus which is suitable to broad-band communication. The portable communication apparatus is small in size.

While this invention has thus far been described in conjunction with an embodiment thereof, it will be readily possible for those skilled in the art to put this invention into practice in various other manners. In the portable radio communication apparatus illustrated in FIG. 6, the first and the second resonance frequencies $f_1$ and $f_2$ can be controlled by controlling the first and the second antenna lengths $L_{g1}$ and $L_{g2}$, respectively. From this view, the antenna portion 21 illustrated in FIG. 6 can be operated as an antenna for communication of a signal of two frequency bands spaced from each other by selecting the VSWR in each of the two frequency bands at a value which is not greater than an allowable value.

What is claimed is:

1. In a portable radio communication apparatus comprising a handset having a side surface, a recessed surface, and a connecting surface between said side and said recessed surfaces, an antenna member, a conductive plate member fixing said antenna member to said recessed surface so that said antenna member does not protrude outwardly of said side surface, electro-audio and audio-electro converting means housed in and coupled to said handset for converting a received electric signal to a received audio signal and a transmitting audio signal to a transmitting electric signal, and a conductive line member for feeding said transmitting electric signal to said antenna member and for receiving said received electric signal from said antenna member, the improvement wherein:

said antenna member comprises a first and a second antenna having different resonance frequencies and a first and a second predetermined point, respectively;

said plate member comprising a first and a second conductive plate fixing said first and said second antennae to said recessed surface, respectively;

said conductive line member comprising a first, a second, and a common conductive line, said first and said second conductive lines connecting said common conductive line to said first and said second predetermined points, respectively, said common conductive line being connected to said electro-audio and audio-electro converting means to feed said transmitting electric signal to said first and said second antennae and to receive said received electric signal from said first and said second antennae.

2. A portable radio communication apparatus as claimed in claim 1, wherein each of said first and said second antennae has a free end spaced from said recessed and said connecting surfaces.

3. A portable radio communication apparatus as claimed in claim 2, said first and said second antennae having a first and a second antenna length, respectively, wherein said first and said second antenna lengths are different from each other so that said first and said second antennae have said different resonance frequencies, respectively.

4. A portable radio communication apparatus as claimed in claim 3, wherein said first and said second antennae are substantially coplanar and are parallel to said recessed surface.

5. A portable radio communication apparatus as claimed in claim 4, said first and said second antennae having a first and a second antenna width, respectively, said first and said second conductive plates having a first and a second plate width, respectively, and a first and a second axis centrally of said first and said second plate widths, respectively, wherein said first and said second plate widths are not greater than said first and said second antenna widths, respectively, said first and said second axes being spaced wider than a half of a sum of said first and said second antenna widths.

6. A portable radio communication apparatus as claimed in claim 5, said first and said second antennae having a first and a second end remote from said connecting surface, respectively, wherein said first and said second conductive plates fix said first and said second antennae to said recessed surface at said first and said second ends, respectively.

7. A portable radio communication apparatus as claimed in claim 6, said first and said second conductive plates having a first and a second plate side outwardly parallel to said first and said second axes, respectively, said first and said second antennae having a first and a second antenna side, respectively, wherein said first and said second conductive plates fix said first and said second antennae to said recessed surface with said first and said second plate sides rendered coplanar with said first and said second antenna sides, respectively.

* * * * *